(12) United States Patent
Liu

(10) Patent No.: US 11,653,274 B2
(45) Date of Patent: May 16, 2023

(54) INFORMATION GENERATING METHOD AND DEVICE, SIGNAL TRANSMITTING METHOD AND DEVICE

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/446,979

(22) Filed: Sep. 6, 2021

(65) Prior Publication Data

US 2021/0400543 A1 Dec. 23, 2021

Related U.S. Application Data

(63) Continuation of application No. 16/637,741, filed as application No. PCT/CN2017/096798 on Aug. 10, 2017, now Pat. No. 11,159,993.

(51) Int. Cl.
*H04W 36/00* (2009.01)
*H04W 36/08* (2009.01)
*H04W 36/32* (2009.01)

(52) U.S. Cl.
CPC ....... *H04W 36/0061* (2013.01); *H04W 36/08* (2013.01); *H04W 36/32* (2013.01)

(58) Field of Classification Search
CPC ............. H04W 36/0061; H04W 36/08; H04W 36/32; H04W 48/12; H04W 48/16; H04W 48/20; H04W 36/26
See application file for complete search history.

(56) References Cited

U.S. PATENT DOCUMENTS 11,159,993 B2 * 10/2021 Liu .................. H04W 36/08
2015/0351135 A1 12/2015 Schmidt
(Continued)

FOREIGN PATENT DOCUMENTS

CN 105992236 A 10/2016
CN 106358312 A 1/2017
(Continued)

OTHER PUBLICATIONS

MEDIATEK Inc. Downlink Measurements for NR Mobility. 3GPP TSG-RAN WG2 Meeting #95bis R2-166092. Oct. 14, 2016 (Oct. 14, 2016), entire document.
(Continued)

*Primary Examiner* — Marisol Figueroa
(74) *Attorney, Agent, or Firm* — Syncoda LLC; Feng Ma

(57) ABSTRACT

An information generating method can be applied to user equipment, and include: receiving a first beam signal of a first cell where the user equipment is located, wherein the first beam signal comprises second identifier information of a second beam signal, and the second beam signal is at least one beam signal adjacent to the first beam signal in a second cell adjacent to the first cell; determining the at least one second beam signal according to the second identifier information, and receiving the at least one second beam signal; and generating cell handover information according to the at least one second beam signal and the first beam signal. According to the embodiments of the present invention, time consumed by a user equipment during cell handover can be shortened, thereby facilitating increasing the speed of cell handover by the user equipment.

18 Claims, 13 Drawing Sheets

(56) References Cited

U.S. PATENT DOCUMENTS

| | | |
|---|---|---|
| 2016/0277088 A1 | 9/2016 | Jo et al. |
| 2017/0156097 A1 | 6/2017 | Weber et al. |
| 2017/0353870 A1 | 12/2017 | Rybakowski et al. |
| 2018/0279189 A1 | 9/2018 | Bergstrom et al. |
| 2018/0324687 A1 | 11/2018 | Chen |
| 2020/0374938 A1 | 11/2020 | Yan et al. |

FOREIGN PATENT DOCUMENTS

| | | |
|---|---|---|
| CN | 106374984 A | 2/2017 |
| CN | 106686631 A | 5/2017 |
| CN | 107027129 A | 8/2017 |
| EP | 2928234 A1 | 10/2015 |
| KR | 20160143509 A | 12/2016 |
| WO | 2016055003 A1 | 4/2016 |
| WO | 2016096006 A1 | 6/2016 |

OTHER PUBLICATIONS

International Search Report in the international application No. PCT/CN2017/096798, dated Apr. 28, 2018.
Written Opinion of the International Search Authority in the international application No. PCT/CN2017/096798, dated Apr. 28, 2018.
First Office Action of the Chinese application No. 201780000847.1, dated May 9, 2020.
NEC: "Measurement and Reporting for Inter-Cell Mobility in NR", 3GPP Draft; R2-168402, 3rd Generation Partnership Project (3GPP), Morile Competence Centre; 650, Route Des Lucioles: F-06921 Sophia-Antipolis Cedex: France, vol. RAN WG2, No. Reno, USA: Nov. 14, 2016 Nov. 18, 2016 Nov. 13, 2016 (Nov. 13, 2016), XP051178005.
Supplementary European Search Report in the European application No. 17920696.6, dated Apr. 20, 2021.
First Office Action of the Indian application No. 202047009708, dated Aug. 16, 2021.
First Office Action of the U.S. Appl. No. 16/637,741, dated Mar. 4, 2021.
Notice of Allowance of the U.S. Appl. No. 16/637,741, dated Jul. 9, 2021.
Corrected Notice of Allowance of the U.S. Appl. No. 16/637,741, dated Aug. 9, 2021.
3GPP TR 38.811 V0.1.0 (Jun. 2017), 3rd Generation Partnership Project; Technical Specification Group Radio Access Network; Study on New Radio (NR) to support Non Terrestrial Networks, (Release 15).

* cited by examiner

INFORMATION GENERATING METHOD AND DEVICE, SIGNAL TRANSMITTING METHOD AND DEVICE

CROSS-REFERENCE TO RELATED APPLICATIONS

This is a continuation of U.S. patent application Ser. No. 16/637,741 filed on Feb. 8, 2020, which is a national stage of International Application No. PCT/CN2017/096798 filed on Aug. 10, 2017. The disclosures of these applications are hereby incorporated by reference in their entirety.

BACKGROUND

At present, in 5th-Generation (5G) standardization of a 3rd Generation Partnership Project (3GPP), a synchronized block may be transmitted mainly by beam scan, and a synchronized block may bear a synchronization signal and a Physical Broadcast Channel (PBCH).

SUMMARY

The present disclosure relates generally to the field of communications, and more specifically to a method for generating information, a device for generating information, a method for sending a signal, a device for sending a signal, User Equipment (UE), and a computer-readable storage medium.

Various embodiments of the present disclosure provide a method for generating information, a device for generating information, a method for sending a signal, a device for sending a signal, UE, and a computer-readable storage medium.

According to a first aspect of the present disclosure, a method for generating information applies to User Equipment (UE). The method includes:
receiving a first beam signal from a first cell where the UE camps, the first beam signal including second identification information that identifies a second beam signal, the second beam signal being at least one beam signal from a second cell neighboring the first cell, the at least one second beam signal neighboring the first beam signal;
determining the at least one second beam signal according to the second identification information; receiving the at least one second beam signal; and
generating cell handover information according to the at least one second beam signal and the first beam signal.

The UE may be in a connected state. The UE may be in an idle state.

The method may further include: in response to the UE being in the idle state, while receiving the first beam signal, receiving another beam signal from the first cell that is spaced from the first beam signal by a number of beams less than a preset number.

The generating cell handover information according to the at least one second beam signal and the first beam signal may include: generating the cell handover information according to the at least one second beam signal, the first beam signal, and the another beam signal.

The first beam signal may further include identification information that identifies the second cell. The method may further include:
in response to the UE being in the connected state, determining whether the second cell is in a scene of high mobility according to the identification information that identifies the second cell; and
in response to the second cell being in a scene of high mobility, accessing the second cell according to the cell handover information.

The second beam signal from the second cell in the scene of high mobility may include a perpendicular beam signal perpendicular to a direction in which the UE moves, and a parallel beam signal parallel to the direction in which the UE moves.

The accessing the second cell according to the cell handover information may include: establishing a communication connection with a base station that manages the second cell, and receiving the parallel beam signal.

According to a second aspect of the present disclosure, a method for sending a signal applies to a base station. The method includes:
determining User Equipment (UE) that receives a first beam signal sent by the base station;
receiving second identification information in a beam signal sent by a neighbor base station of the base station, the second identification information identifying at least one second beam signal sent by the neighbor base station, the at least one second beam signal neighboring the first beam signal; and
sending the second identification information to the UE.

Receiving the second identification information may include: receiving the second beam signal, the second beam signal carrying the second identification information.

Receiving the second identification information may include: receiving the second identification information through an interface between the base station and the neighbor base station.

According to a third aspect of the present disclosure, a device for generating information applies to User Equipment (UE). The device includes a receiving portion and a generating portion.

The receiving portion is adapted to: receiving a first beam signal from a first cell where the UE camps, the first beam signal including second identification information that identifies a second beam signal, the second beam signal being at least one beam signal from a second cell neighboring the first cell, the at least one second beam signal neighboring the first beam signal; determining the at least one second beam signal according to the second identification information; receiving the at least one second beam signal.

The generating portion is adapted to: generating cell handover information according to the at least one second beam signal and the first beam signal.

The UE may be in a connected state. The UE may be in an idle state.

The receiving portion may be further adapted to, in response to the UE being in the idle state, while receiving the first beam signal, receiving another beam signal from the first cell that is spaced from the first beam signal by a number of beams less than a preset number.

The generating portion may be adapted to generating the cell handover information according to the at least one second beam signal, the first beam signal, and the another beam signal.

The first beam signal may further include identification information that identifies the second cell. The device may further include a cell determining portion and a handover portion.

The cell determining portion may be adapted to, in response to the UE being in the connected state, determining whether the second cell is in a scene of high mobility according to the identification information that identifies the second cell.

The handover portion may be adapted to, in response to the second cell being in a scene of high mobility, accessing the second cell according to the cell handover information.

The second beam signal from the second cell in the scene of high mobility may include a perpendicular beam signal perpendicular to a direction in which the UE moves, and a parallel beam signal parallel to the direction in which the UE moves.

The handover portion may be adapted to: establishing a communication connection with a base station that manages the second cell, and receiving the parallel beam signal.

According to a fourth aspect of the present disclosure, a device for sending a signal applies to a base station. The device includes an equipment determining portion, an information receiving portion, and an information sending portion.

The equipment determining portion is adapted to determining User Equipment (UE) that receives a first beam signal sent by the base station.

The information receiving portion is adapted to receiving second identification information in a beam signal sent by a neighbor base station of the base station. The second identification information identifies at least one second beam signal sent by the neighbor base station. The at least one second beam signal neighbors the first beam signal.

The information sending portion is adapted to sending the second identification information to the UE.

The information receiving portion may be adapted to receiving the second beam signal. The second beam signal may carry the second identification information.

The information receiving portion may be adapted to receiving the second identification information through an interface between the base station and the neighbor base station.

According to a fifth aspect of the present disclosure, User Equipment (UE) includes a processor and memory.

The memory is adapted to storing an instruction executable by the processor.

The processor is adapted to:
receiving a first beam signal from a first cell where the UE camps, the first beam signal including second identification information that identifies a second beam signal, the second beam signal being at least one beam signal from a second cell neighboring the first cell, the at least one second beam signal neighboring the first beam signal;
determining the at least one second beam signal according to the second identification information; receiving the at least one second beam signal; and
generating cell handover information according to the at least one second beam signal and the first beam signal.

According to a sixth aspect of the present disclosure, a base station includes a processor and memory.

The memory is adapted to storing an instruction executable by the processor.

The processor is adapted to:
determining User Equipment (UE) that receives a first beam signal sent by the base station;
receiving second identification information in a beam signal sent by a neighbor base station of the base station, the second identification information identifying at least one second beam signal sent by the neighbor base station, the at least one second beam signal neighboring the first beam signal; and
sending the second identification information to the UE.

According to a seventh aspect of the present disclosure, a computer-readable storage medium has stored thereon a computer program that, when executed by a processor, causes the processor to perform:
receiving a first beam signal from a first cell where the UE camps, the first beam signal including second identification information that identifies a second beam signal, the second beam signal being at least one beam signal from a second cell neighboring the first cell, the at least one second beam signal neighboring the first beam signal;
determining the at least one second beam signal according to the second identification information; receiving the at least one second beam signal; and
generating cell handover information according to the at least one second beam signal and the first beam signal.

According to an eighth aspect of the present disclosure, a computer-readable storage medium has stored thereon a computer program that, when executed by a processor, causes the processor to perform:
determining User Equipment (UE) that receives a first beam signal sent by the base station;
receiving second identification information in a beam signal sent by a neighbor base station of the base station, the second identification information identifying at least one second beam signal sent by the neighbor base station, the at least one second beam signal neighboring the first beam signal; and
sending the second identification information to the UE.

The above general description and elaboration below are but exemplary and explanatory, and do not limit the subject disclosure.

BRIEF DESCRIPTION OF THE DRAWINGS

Drawings for describing embodiments herein are introduced below briefly for clearer illustration of a technical solution of embodiments herein. Note that the drawings described below refer merely to some embodiments herein. A person having ordinary skill in the art may acquire other drawings according to the drawings herein without creative effort.

DETAILED DESCRIPTION

Figure 1:
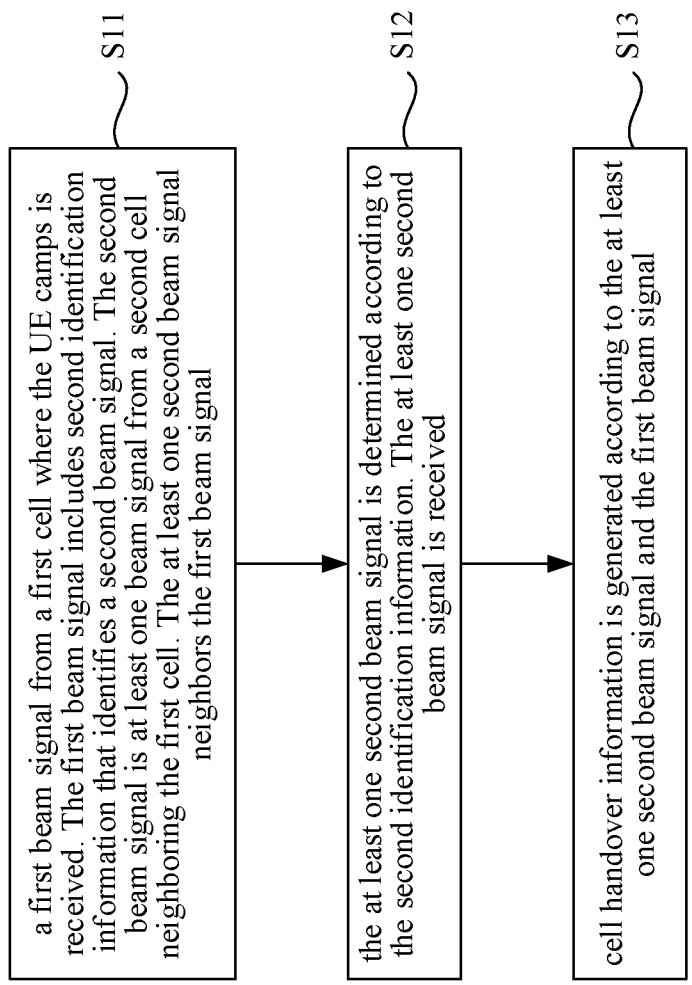
FIG. 1 is a flowchart of a method for generating information according to an exemplary embodiment.

Exemplary embodiments (examples of which are illustrated in the accompanying drawings) are elaborated below. The following description refers to the accompanying drawings, in which identical or similar elements in two drawings are denoted by identical reference numerals unless indicated otherwise. Implementations set forth in the following exemplary embodiments do not represent all implementations in accordance with the subject disclosure. Rather, they are merely examples of the apparatus and method in accordance with certain aspects herein as recited in the accompanying claims.

User equipment (UE) may receive a beam signal to acquire a synchronized block in the beam signal. During cell handover, the UE may have to receive not only a beam signal from a cell where the UE camps, but also a beam signal from a neighbor cell. The UE may also have to determine both a Signal-to-Noise Ratio (SNR) of the beam signal from the cell where the UE camps and an SNR of the beam signal from the neighbor cell. The UE may have to upload each SNR and an identification of a beam signal corresponding to the each SNR to a base station managing the cell.

However, to determine identification information that identifies a beam signal from a neighbor cell, UE may have to parse information borne on a PBCH in the beam signal. The parse may be time consuming, which may prevent UE from being handed over to a target cell in time.

FIG. 1 is a flowchart of a method for generating information according to an exemplary embodiment. The method for generating information applies to UE such as a mobile phone, a tablet computer, etc. The UE may receive a beam signal from a cell formed by a base station such as a 5G base station. As shown in FIG. 1, the method for generating information includes at least one option as follows.

In S11, a first beam signal from a first cell where the UE camps is received. The first beam signal includes second identification information that identifies a second beam signal. The second beam signal is at least one beam signal from a second cell neighboring the first cell. The at least one second beam signal neighbors the first beam signal.

In S12, the at least one second beam signal is determined according to the second identification information. The at least one second beam signal is received.

In S13, cell handover information is generated according to the at least one second beam signal and the first beam signal.

The cell handover information thus generated may include an SNR of the first beam signal. The cell handover information may include an SNR of each of the at least one second beam signal. The cell handover information may be transmitted to a base station corresponding to or managing the first cell and/or the second cell. The base station may determine whether cell handover is required for the UE.

Figure 2:
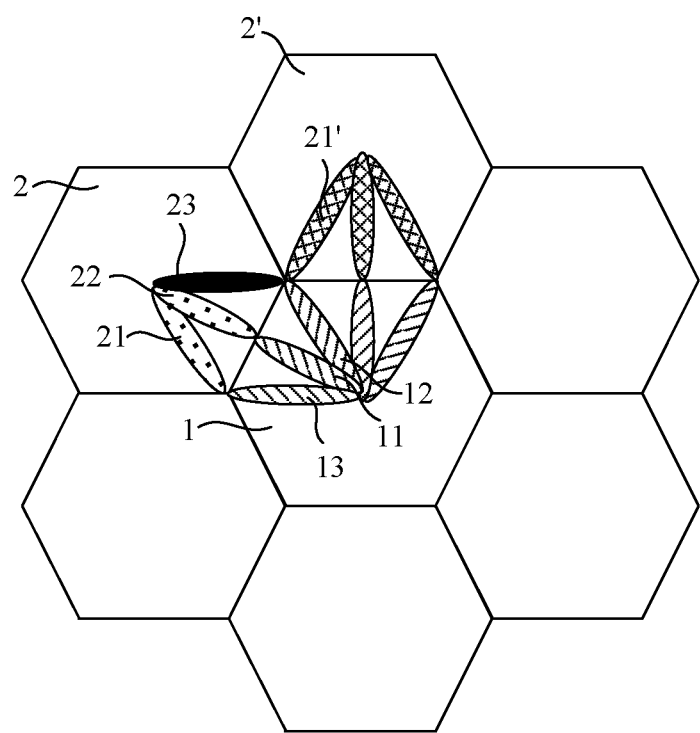
FIG. 2 is a diagram of a beam signal relation according to an exemplary embodiment.

FIG. 2 is a diagram of a beam signal relation according to an exemplary embodiment.

As shown in FIG. 2, the first cell and the second cell may be formed by 5G base stations. Multiple cells may form a cellular network. There may be six second cells 2 neighboring the first cell 1.

A first base station corresponding to/managing/forming the first cell may transmit multiple first beam signals. The first base station may store second identification information that identifies a second beam signal neighboring a respective first beam signal. For example, second beam signals 21, 22, and 23 from a second cell 2 may neighbor a first beam signal 11 from the first cell.

A number and range of beam signals neighboring a beam signal may be set as needed. For example, as shown in FIG. 2, the second beam signal 22 from the second cell that is opposite to the first beam signal 11, and second beam signals 21 and 23 beside the second beam signal 22, may be set as second beam signals neighboring the first beam signal 11. Alternatively, only the second beam signal 22 may be set as the second beam signal neighboring the first beam signal 11.

As another example, a second beam signal corresponding to a first beam signal 12 from the first cell may include a second beam signal 23 from the second cell 2 and a second beam signal 21' from a second cell 2'. Accordingly, the second beam signals 23 and 21' may be set as second beam signals neighboring the first beam signal 12.

When UE receives the first beam signal 11 in the first cell, second identification information that respectively identifies second beam signals 21, 22, and 23 may be acquired. The second beam signals 21, 22, and 23 neighbor (namely, are close to) the first beam signal 11. Therefore, after the UE has been handed over to the second cell 2 from the first beam signal 11, strength of second beam signals 21, 22, and 23 received by the UE may be greater than strength of another beam in the second cell 2. This may ensure a good communication result regardless of which one of the three second beam signals is received by the UE after the handover.

Accordingly, by transmitting identification information that identifies at least one second beam signal to UE, on one hand, the UE is allowed to determine the identification information that identifies the second beam signal to determine and receive the second beam signal without having to parse information borne on a PBCH of the second beam signal. On the other hand, the UE may compute only the SNR of the second beam signal without having to compute the SNR of each second beam signal from the second cell. Both may reduce time consumed in a handover and speed up the handover of the UE.

The UE may be in a connected state. The UE may be in an idle state.

Figure 3:
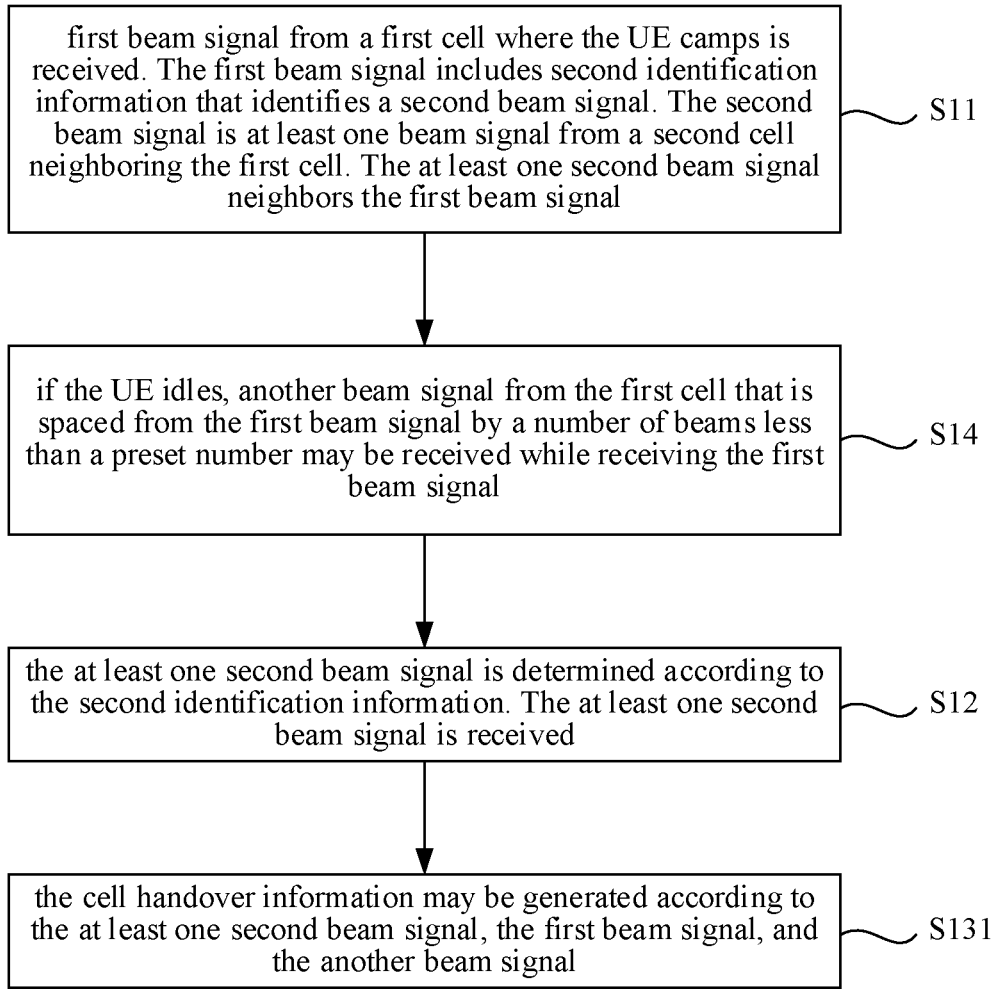
FIG. 3 is a flowchart of a method for generating information according to an exemplary embodiment.

FIG. 3 is a flowchart of a method for generating information according to an exemplary embodiment. As shown in FIG. 3, the method for generating information may further include at least one option as follows.

In S14, if the UE idles, another beam signal from the first cell that is spaced from the first beam signal by a number of beams less than a preset number may be received while receiving the first beam signal.

The cell handover information may be generated according to the at least one second beam signal and the first beam signal as follows.

In S131, the cell handover information may be generated according to the at least one second beam signal, the first beam signal, and the another beam signal.

UE that camps on a first cell and receives a first beam signal may be in the connected state, or may be in the idle state. UE in the idle state may stay in a sleep stage and an awake stage periodically. For example, UE may stay awake for 5 milliseconds after sleeps for 600 milliseconds. UE may receive no signal during the sleep stage. UE may receive a signal in the awake stage. In general, the sleep stage may be longer than the awake stage in each period. Therefore, there may be a change in strength of a beam signal from the first cell during the sleep stage.

For example, in FIG. 2, the UE may receive the first beam signal 11 in the awake stage. There may be an increase in strength of first beam signals 12 and 13 during the sleep stage. However, the UE may have uploaded only the SNRs of the first beam signal 11 and of the second beam signals 21, 22, and 23 to the base station. The base station may determine, according to the SNRs of the four beam signals, that the first cell is no longer suitable for the UE and therefore have the UE handed over to a second cell. As SNRs of the first beam signals 12 and 13 may increase with increased signal strength thereof whilst the base station does not take the two beam signals into consideration, this may lead to a misjudgment.

Accordingly, the UE may receive another beam signal from the first cell that is spaced from the first beam signal by a number of beams less than a preset number. For example, the preset number may be 0. Then, the another beam signal may be the two beam signals neighboring the first beam signal. For example, for the first beam signal 11 in FIG. 2, the another beam signal may be the first beam signals 12 and 13. Accordingly, cell handover information may be generated according to at least one second beam signal, the first beam signal, and the another beam signal, namely considering the another beam signal. Then, the SNR of the another beam signal may be generated and uploaded to the base station, such that more comprehensive beam signals may be considered by the base station, ensuring that it may be determined accurately whether cell handover is required for the UE even if there is a change in strength of a beam signal from the first cell during the sleep stage of the UE.

Figure 4:
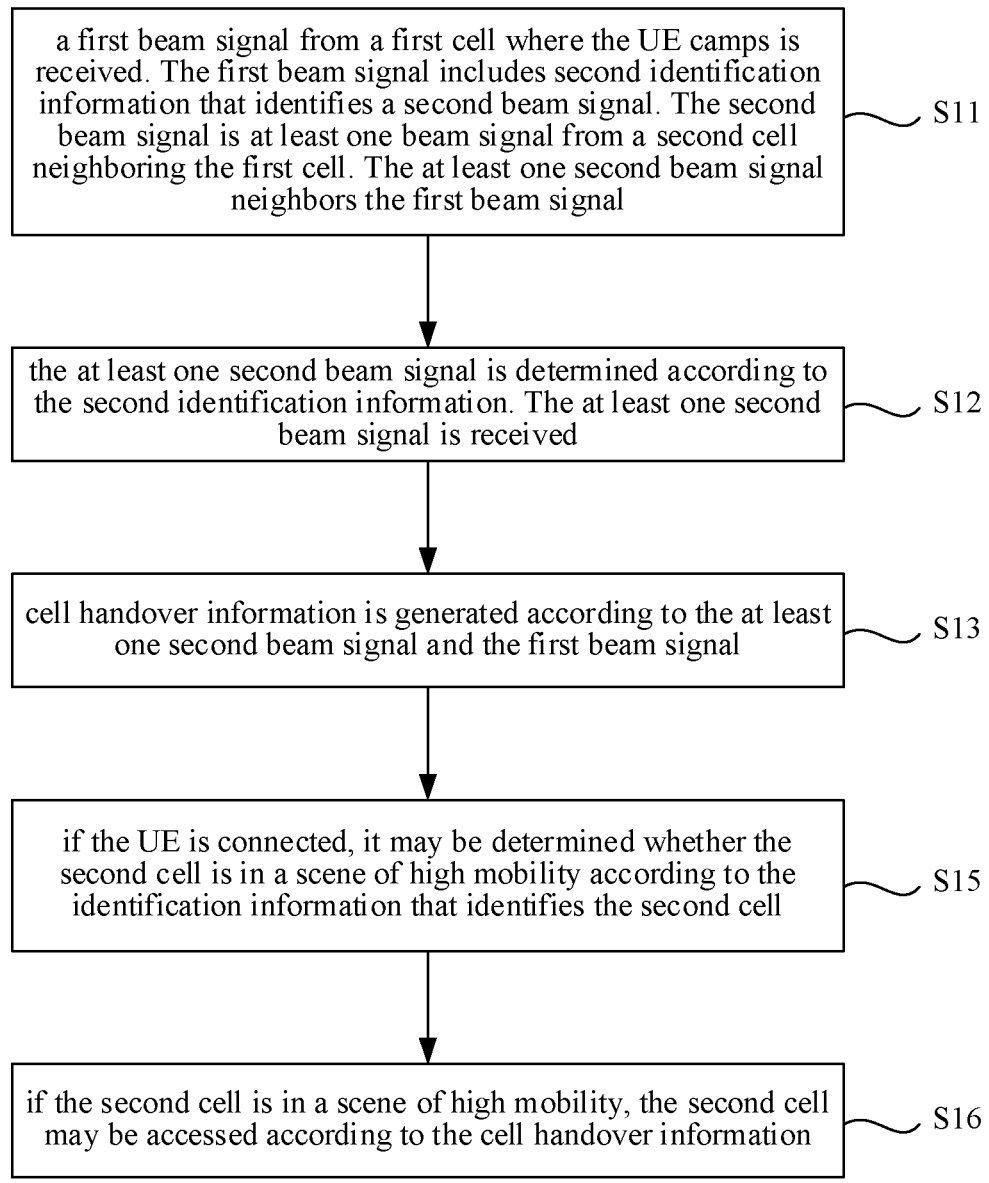
FIG. 4 is a flowchart of a method for generating information according to an exemplary embodiment.

FIG. 4 is a flowchart of a method for generating information according to an exemplary embodiment. As shown in FIG. 4, the first beam signal may further include identification information that identifies the second cell. The method may further include at least one option as follows.

In S15, if the UE is connected, it may be determined whether the second cell is in a scene of high mobility according to the identification information that identifies the second cell.

In S16, if the second cell is in a scene of high mobility, the second cell may be accessed according to the cell handover information.

A cell in a scene of high mobility may be a cell along a high-speed railway, a cell along a line of another transportation that moves at a high speed (greater than 300 kilometers/hour, for example), etc.

Consider such a cell in a scene of high mobility. UE may generate cell handover information and then upload the cell handover information to a base station and the base station may analyze the cell handover information to determine whether cell handover is required for the UE. This may result in a delay. For UE moving at a high speed, even an extremely small delay may cause the UE to miss the proper timing for handover and lead to a handover failure.

Therefore, it may be set that for a second cell in a scene of high mobility, after UE has generated cell handover information, the UE may be allowed to be handed over to the second cell straightforwardly and receive a second beam signal sent in the second cell. A second beam signal of the at least one second beam signal that has a maximal SNR may be determined according to cell handover information, and received, thereby minimizing a delay in handover of UE between cells, ensuring good performance in handover of UE between cells in a scene of high mobility.

Figure 5:
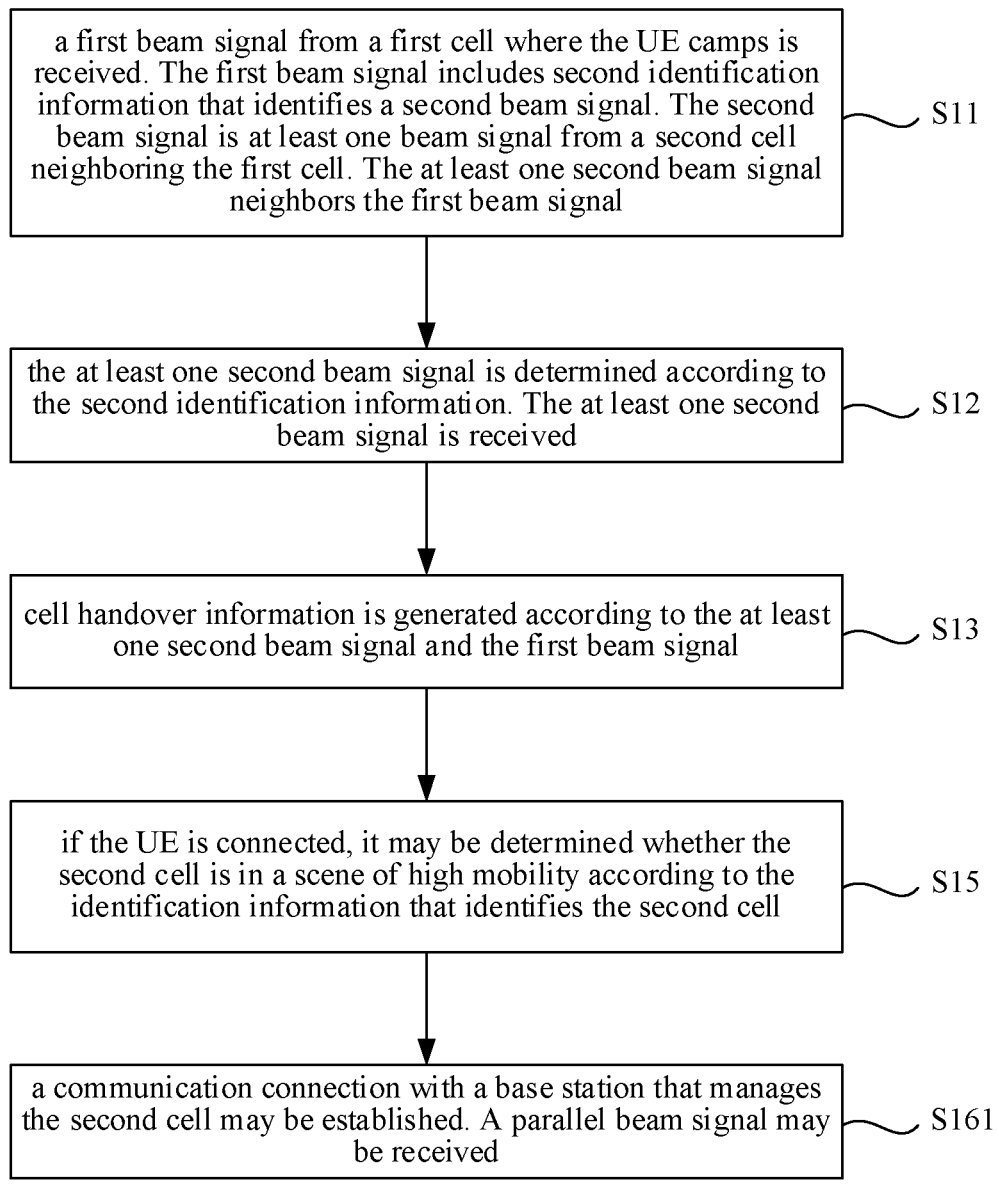
FIG. 5 is a flowchart of a method for generating information according to an exemplary embodiment.

FIG. 5 is a flowchart of a method for generating information according to an exemplary embodiment. As shown in FIG. 5, the second beam signal from the second cell in the scene of high mobility may include a perpendicular beam signal perpendicular to a direction in which the UE moves, and a parallel beam signal parallel to the direction in which the UE moves. The second cell may be accessed according to the cell handover information as follows.

In S161, a communication connection with a base station that manages the second cell may be established. The parallel beam signal may be received.

UE may be handed over to the second cell and receive the parallel beam signal. The parallel beam signal is parallel to the direction in which the UE moves. Thus, it is ensured that the UE may receive the parallel beam signal during movement, without having to switch frequently from receiving one beam signal to receiving another.

Figure 6:
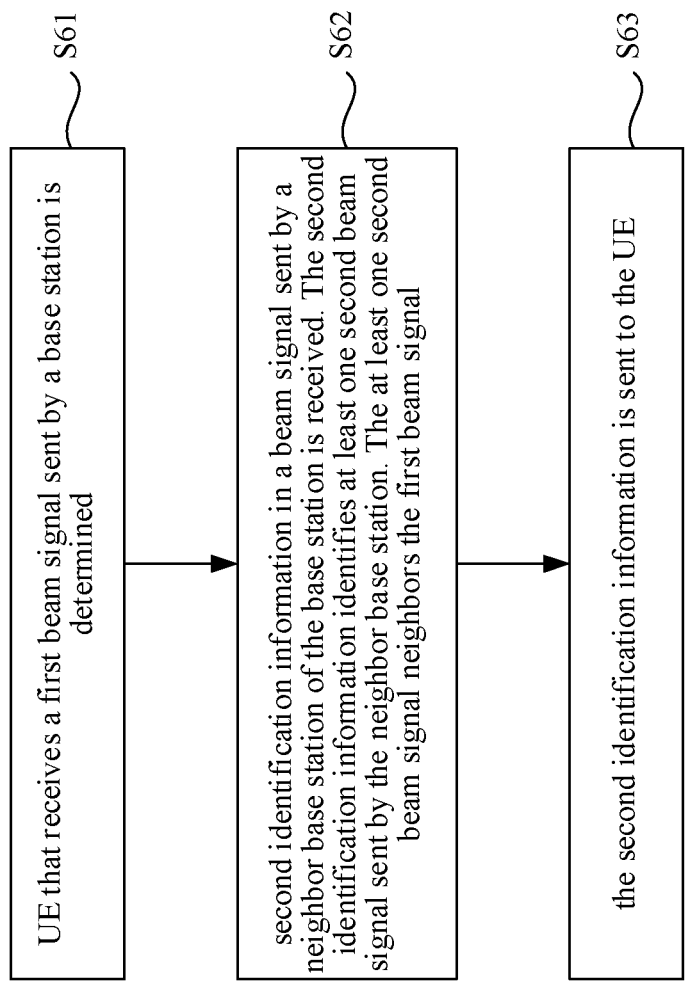
FIG. 6 is a flowchart of a method for sending a signal according to an exemplary embodiment.

FIG. 6 is a flowchart of a method for sending a signal according to an exemplary embodiment. The method for sending a signal may apply to a base station such as a 5G base station. As shown in FIG. 6, the method for sending a signal may include at least one option as follows.

In S61, UE that receives a first beam signal sent by a base station is determined.

In S62, second identification information in a beam signal sent by a neighbor base station of the base station is received. The second identification information identifies at least one second beam signal sent by the neighbor base station. The at least one second beam signal neighbors the first beam signal.

In S63, the second identification information is sent to the UE.

For each first beam signal sent by a base station, the base station may receive second identification information that identifies at least one second beam signal (sent by a neighbor base station) that neighbors the first beam signal. For example, as shown in FIG. 2, a first base station corresponding to a first cell 1 may transmit multiple first beam signals. For each first beam signal such as the first beam signal 11 from the first cell 1, the base station may receive identification information that identifies second beam signals 21, 22, and 23 sent by a neighbor base station of the base station.

The base station may transmit the identification information that identifies a second beam signal to UE that receives the first beam signal, such that on one hand, the UE is allowed to determine the identification information that identifies the second beam signal to determine and receive the second beam signal without having to parse information borne on a PBCH of the second beam signal, and on the other hand, the UE may compute only the SNR of the second beam signal without having to compute the SNR of each second beam signal from the second cell. Both may reduce time consumed in a handover and speed up the handover of the UE.

Figure 7:
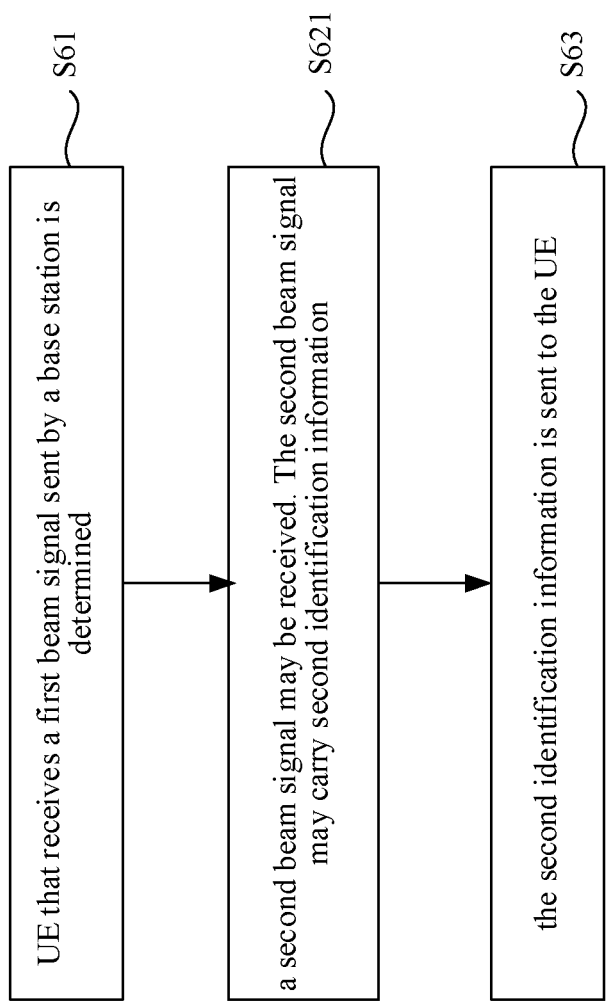
FIG. 7 is a flowchart of a method for sending a signal according to an exemplary embodiment.

FIG. 7 is a flowchart of a method for sending a signal according to an exemplary embodiment. As shown in FIG. 7, the second identification information may be received as follows.

In S621, the second beam signal may be received. The second beam signal may carry second identification information.

Figure 8:
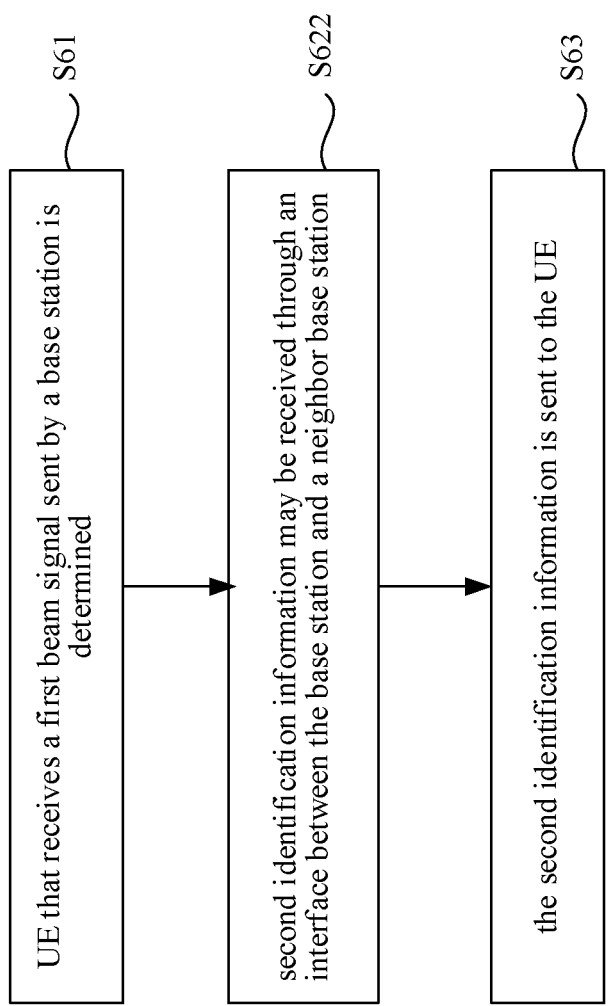
FIG. 8 is a flowchart of a method for sending a signal according to an exemplary embodiment.

FIG. 8 is a flowchart of a method for sending a signal according to an exemplary embodiment. As shown in FIG. 8, the second identification information may be received as follows.

In S622, the second identification information may be received through an interface between the base station and the neighbor base station.

The base station may receive the second beam signal sent by the neighbor base station and acquire the second identification information in the second beam signal according to the embodiment shown in FIG. 7. The second identification information may be received through an interface (such as an X2 interface) between the base station and the neighbor base station according to the embodiment shown in FIG. 8. The second identification information may be received in a mode selected as needed.

Embodiments herein further provide a device for generating information and a device for sending a signal corresponding respectively to the method for generating information and the method for sending a signal according to the previous embodiments.

Figure 9:
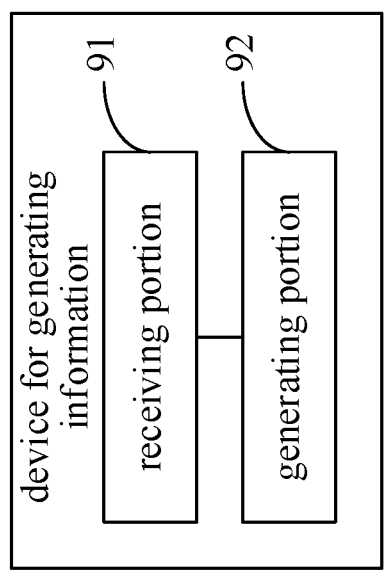
FIG. 9 is a block diagram of a device for generating information according to an exemplary embodiment.

FIG. 9 is a block diagram of a device for generating information according to an exemplary embodiment. The device for generating information may apply to UE. As shown in FIG. 9, the device for generating information may include a receiving portion and a generating portion.

The receiving portion 91 may be adapted to: receiving a first beam signal from a first cell where the UE camps, the first beam signal including second identification information that identifies a second beam signal, the second beam signal being at least one beam signal from a second cell neighboring the first cell, the at least one second beam signal neighboring the first beam signal; determining the at least one second beam signal according to the second identification information; receiving the at least one second beam signal.

The generating portion 92 may be adapted to generating cell handover information according to the at least one second beam signal and the first beam signal.

The UE may be in a connected state. The UE may be in an idle state.

The receiving portion may be further adapted to, in response to the UE being in the idle state, while receiving the first beam signal, receiving another beam signal from the first cell that is spaced from the first beam signal by a number of beams less than a preset number.

The generating portion may be adapted to generating the cell handover information according to the at least one second beam signal, the first beam signal, and the another beam signal.

Figure 10:
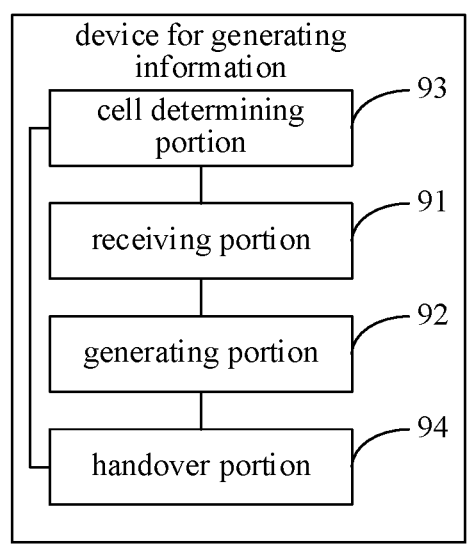
FIG. 10 is a block diagram of a device for generating information according to an exemplary embodiment.

FIG. 10 is a block diagram of a device for generating information according to an exemplary embodiment. The first beam signal may further include identification information that identifies the second cell. As shown in FIG. 10, the device may further include a cell determining portion and a handover portion.

The cell determining portion 93 may be adapted to, in response to the UE being in the connected state, determining whether the second cell is in a scene of high mobility according to the identification information that identifies the second cell.

The handover portion 94 may be adapted to, in response to the second cell being in a scene of high mobility, accessing the second cell according to the cell handover information.

The second beam signal from the second cell in the scene of high mobility may include a perpendicular beam signal perpendicular to a direction in which the UE moves, and a parallel beam signal parallel to the direction in which the UE moves. The handover portion may be adapted to: establishing a communication connection with a base station that manages the second cell, and receiving the parallel beam signal.

Figure 11:
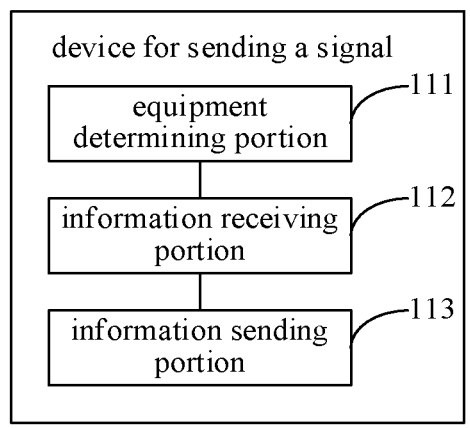
FIG. 11 is a block diagram of a device for sending a signal according to an exemplary embodiment.

FIG. 11 is a block diagram of a device for sending a signal according to an exemplary embodiment. The device for sending a signal may apply to a base station. As shown in FIG. 11, the device for sending a signal may include an equipment determining portion, an information receiving portion, and an information sending portion.

The equipment determining portion 111 may be adapted to determining User Equipment (UE) that receives a first beam signal sent by the base station.

The information receiving portion 112 may be adapted to receiving second identification information in a beam signal sent by a neighbor base station of the base station. The second identification information may identify at least one second beam signal sent by the neighbor base station. The at least one second beam signal neighbors the first beam signal.

The information sending portion 113 may be adapted to sending the second identification information to the UE.

The information receiving portion may be adapted to receiving the second beam signal. The second beam signal may carry the second identification information.

The information receiving portion may be adapted to receiving the second identification information through an interface between the base station and the neighbor base station.

Refer to an exemplary method herein for elaboration of a way a portion of the device herein executes an operation, which is not repeated here.

A device embodiment herein basically corresponds to a method embodiment herein, description of which may be referred to for a related part thereof. A device embodiment described herein is but schematic. Portions described herein as separate parts may or may not be physically separate. A part displayed as a portion may or may not be a physical portion. That is, it may be located in one place, or distributed over multiple network portions. Some or all of the portions herein may be selected as needed to achieve an effect of a solution herein. A person having ordinary skill in the art may understand and implement the above without creative effort.

At least one embodiment herein proposes UE. The UE includes a processor and memory.

The memory is adapted to storing an instruction executable by the processor.

The processor is adapted to:
receiving a first beam signal from a first cell where the UE camps, the first beam signal including second identification information that identifies a second beam signal, the second beam signal being at least one beam signal from a second cell neighboring the first cell, the at least one second beam signal neighboring the first beam signal;
determining the at least one second beam signal according to the second identification information; receiving the at least one second beam signal; and
generating cell handover information according to the at least one second beam signal and the first beam signal.

At least one embodiment herein proposes a base station. The base station includes a processor and memory.

The memory is adapted to storing an instruction executable by the processor.

The processor is adapted to:
determining User Equipment (UE) that receives a first beam signal sent by the base station;
receiving second identification information in a beam signal sent by a neighbor base station of the base station, the second identification information identifying at least one second beam signal sent by the neighbor base station, the at least one second beam signal neighboring the first beam signal; and
sending the second identification information to the UE.

At least one embodiment herein proposes a computer-readable storage medium having stored thereon a computer program that, when executed by a processor, causes the processor to perform:
- receiving a first beam signal from a first cell where the UE camps, the first beam signal including second identification information that identifies a second beam signal, the second beam signal being at least one beam signal from a second cell neighboring the first cell, the at least one second beam signal neighboring the first beam signal;
- determining the at least one second beam signal according to the second identification information; receiving the at least one second beam signal; and
- generating cell handover information according to the at least one second beam signal and the first beam signal.

At least one embodiment herein proposes a computer-readable storage medium having stored thereon a computer program that, when executed by a processor, causes the processor to perform:
- determining User Equipment (UE) that receives a first beam signal sent by the base station;
- receiving second identification information in a beam signal sent by a neighbor base station of the base station, the second identification information identifying at least one second beam signal sent by the neighbor base station, the at least one second beam signal neighboring the first beam signal; and
- sending the second identification information to the UE.

Figure 12:
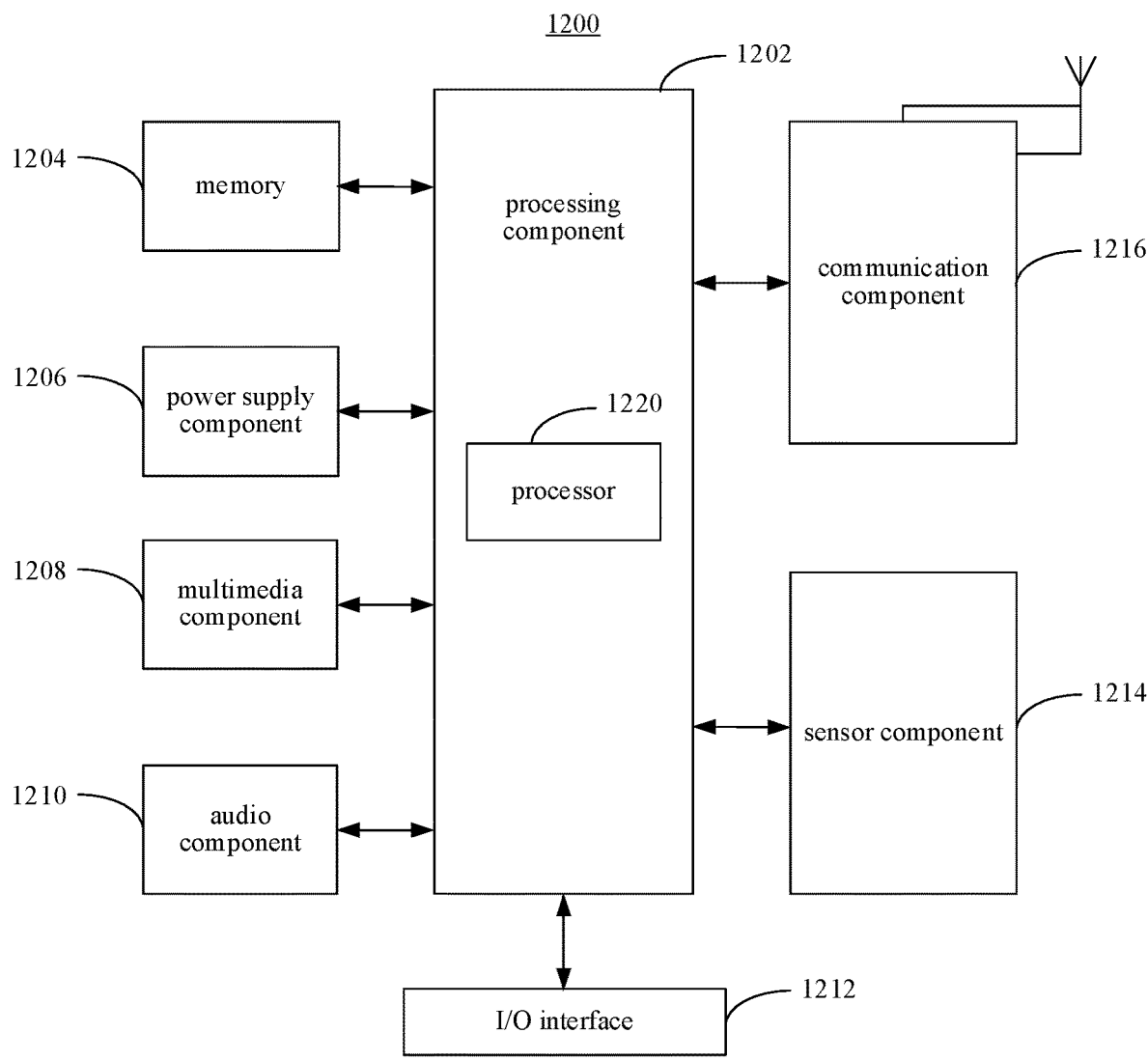
FIG. 12 is a block diagram of a device for generating information according to an exemplary embodiment.

FIG. 12 is a block diagram of a device 1200 for generating information according to an exemplary embodiment. For example, the device 1200 may be a mobile phone, a computer, a digital broadcast UE, a messaging device, a gaming console, a tablet, a medical device, exercise equipment, a personal digital assistant, etc.

Referring to FIG. 12, the device 1200 may include at least one of a processing component 1202, memory 1204, a power supply component 1206, a multimedia component 1208, an audio component 1210, an Input/Output (I/O) interface 1212, a sensor component 1214, or a communication component 1216.

The processing component 1202 may generally control an overall operation of the device 1200, such as operations associated with display, a telephone call, data communication, a camera operation, a recording operation, etc. The processing component 1202 may include one or more processors 1220 to execute instructions so as to complete all or a part of an aforementioned method. In addition, the processing component 1202 may include one or more portions to facilitate interaction between the processing component 1202 and other components. For example, the processing component 1202 may include a multimedia portion to facilitate interaction between the multimedia component 1208 and the processing component 1202.

The memory 510 may be adapted to storing various types of data to support the operation at the device 1200. Examples of such data may include instructions of any application or method adapted to operating on the device 1200, contact data, phonebook data, messages, pictures, videos, etc. The memory 1204 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 1206 may supply electric power to various components of the device 1200. The power supply component 1206 may include a power management system, one or more power sources, and other components related to generating, managing, and distributing electricity for the device 1200.

The multimedia component 1208 may include a screen that provides an output interface between the device 1200 and a user. The screen may include a Liquid Crystal Display (LCD), a Touch Panel (TP), etc. In some embodiments, an organic light-emitting diode (OLED) display can be employed If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 1208 may include at least one of a front camera or a rear camera. When the device 1200 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 1210 may be adapted to outputting and/or inputting an audio signal. For example, the audio component 1210 may include a microphone (MIC). When the device 1200 is in an operation mode such as a call mode, a recording mode, a voice recognition mode, etc., the MIC may be adapted to receiving an external audio signal. The received audio signal may be further stored in the memory 1204 or may be sent via the communication component 1216. The audio component 1210 may further include a loudspeaker adapted to outputting the audio signal.

The I/O interface 1212 may provide an interface between the processing component 1202 and a peripheral interface portion. Such a peripheral interface portion may be a keypad, a click wheel, a button, etc. Such a button may include but is not limited to at least one of a homepage button, a volume button, a start button, or a lock button.

The sensor component 1214 may include one or more sensors for assessing various states of the device 1200. For example, the sensor component 1214 may detect an on/off state of the device 1200 and relative positioning of components such as the display and the keypad of the device 1200. The sensor component 1214 may further detect a change in the position of the device 1200 or of a component of the device 1200, whether there is contact between the device 1200 and a user, the orientation or acceleration/deceleration of the device 1200, a change in the temperature of the device 1200, etc. The sensor component 1214 may include a proximity sensor adapted to detecting existence of a nearby object without physical contact. The sensor component 1214 may further include an optical sensor such as a Complementary Metal-Oxide-Semiconductor (CMOS) or a Charge-Coupled-Device (CCD) image sensor used in an imaging application. The sensor component 1214 may further include an acceleration sensor, a gyroscope sensor, a magnetic sensor, a pressure sensor, a temperature sensor, etc.

The communication component 1216 may be adapted to facilitating wired or wireless communication between the device 1200 and other equipment. The device 1200 may access a wireless network based on a communication standard such as Wi-Fi, 2G, 3G . . . , or a combination thereof. The communication component 1216 may broadcast related information or receive a broadcast signal from an external broadcast management system via a broadcast channel. The communication component 1216 may include a Near Field Communication (NFC) portion for short-range communication. For example, the NFC portion may be based on technology such as Radio Frequency Identification (RFID), Infrared Data Association (IrDA), Ultra-Wideband (UWB) technology, Bluetooth (BT), etc.

The device 1200 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement any embodiment shown in FIG. 1 and FIG. 3-FIG. 5.

A non-transitory computer-readable storage medium including instructions, such as memory 1204 including instructions, may be provided. The instructions may be executed by the processor 1220 of the device 1200 to implement an aforementioned method. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

Figure 13:
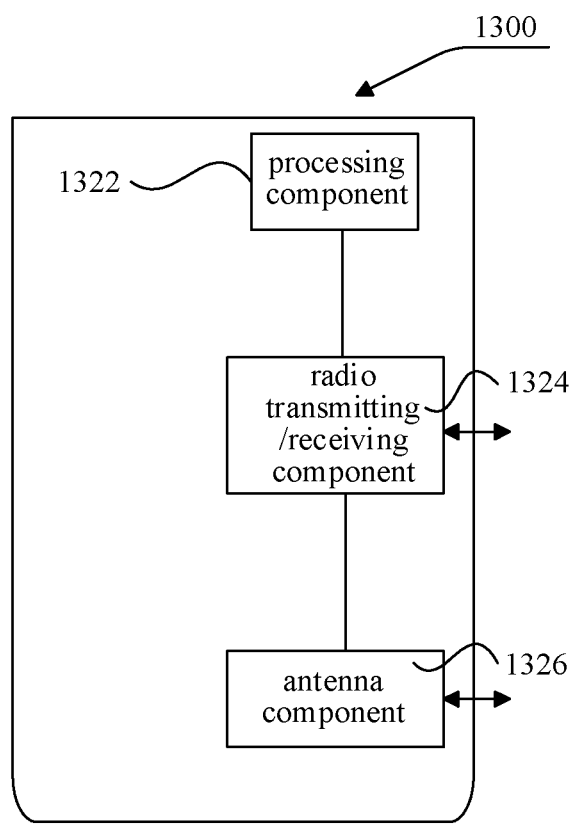
FIG. 13 is a block diagram of a device for sending a signal according to an exemplary embodiment.

FIG. 13 is a block diagram of a device 1300 for sending a signal according to an exemplary embodiment. The device 1300 may be provided as a base station. Referring to FIG. 13, the device 1300 includes a processing component 1322, a radio transmitting/receiving component 1324, an antenna component 1326, and a signal processing part dedicated to a radio interface. The processing component 1322 may further include one or more processors. A processor in the processing component 1322 may be adapted to executing any embodiment shown in FIG. 6 to FIG. 8.

Various embodiments of the present disclosure can have one or more of the following advantages.

By transmitting identification information that identifies at least one second beam signal to UE, on one hand, the UE is allowed to determine the identification information that identifies the second beam signal to determine and receive the second beam signal without having to parse information borne on a PBCH of the second beam signal. On the other hand, the UE may compute only the SNR of the second beam signal without having to compute the SNR of each second beam signal from the second cell. Both may reduce time consumed in a handover and speed up the handover of the UE.

Other embodiments herein will be apparent to one skilled in the art after he/she has considered the subject disclosure and practiced the invention disclosed herein. The subject application is intended to cover any variation, use, or adaptation of the subject disclosure following the general principle of the subject disclosure and including such departures from the subject disclosure as come within known or customary practice in the art. The subject disclosure and its embodiments are intended to be exemplary only, with a true scope and spirit of the subject disclosure being indicated by the appended claims.

The subject disclosure is not limited to the exact construction that has been described above and illustrated in the accompanying drawings. Various modifications and changes can be made without departing from the scope of the subject disclosure. It is intended that the scope of the subject disclosure be limited only by the appended claims.

What is claimed is:

1. A method for generating information, applying to User Equipment (UE), the method comprising:
   receiving a first beam signal from a first cell where the UE camps, the first beam signal comprising second identification information that identifies a plurality of second beam signals, the plurality of second beam signals configured by the first cell being a plurality of neighbor second beam signals neighboring the first beam signal, the plurality of neighbor second beam signals being at least a part of all second beam signals from a second cell neighboring the first cell, the plurality of neighbor second beam signals being spatially closer to the first beam signal compared to the remaining of the all second beam signals from the second cell;
   determining the plurality of neighbor second beam signals configured by the first cell according to the second identification information; receiving the plurality of neighbor second beam signals; and
   reporting cell handover information which is generated according to the plurality of neighbor second beam signals and the first beam signal, wherein the cell handover information includes Signal-to-Noise Ratios (SNRs) of the plurality of neighbor second beam signals configured by the first cell.

2. The method of claim 1, wherein the UE is in a state comprising at least one of a connected state or an idle state.

3. The method of claim 2, further comprising:
   in response to the UE being in the idle state, while receiving the first beam signal, receiving another beam signal from the first cell that is spaced from the first beam signal by a number of beams less than a preset number,
   wherein the generating cell handover information according to the plurality of neighbor second beam signal and the first beam signal comprises:
   generating the cell handover information according to the plurality of neighbor second beam signals, the first beam signal, and the another beam signal.

4. The method of claim 2, wherein the first beam signal further comprises identification information that identifies the second cell, wherein the method further comprises:
   in response to the UE being in the connected state, determining whether the second cell is in a scene of high mobility according to the identification information that identifies the second cell; and
   in response to the second cell being in a scene of high mobility, accessing the second cell according to the cell handover information.

5. The method of claim 4, wherein a second beam signal from the second cell in the scene of high mobility comprises a perpendicular beam signal perpendicular to a direction in which the UE moves, and a parallel beam signal parallel to the direction in which the UE moves,
   wherein the accessing the second cell according to the cell handover information comprises:
   establishing a communication connection with a base station that manages the second cell, and receiving the parallel beam signal.

6. A method for sending a signal, applying to a base station, the method comprising:
   determining User Equipment (UE) that receives a first beam signal sent by the base station;
   receiving second identification information in a beam signal sent by a neighbor base station of the base station, the second identification information identifying a plurality of neighbor second beam signals, the plurality of neighbor second beam signals being at least a part of all second beam signals sent by the neighbor base station, the plurality of neighbor second beam signals being spatially closer to the first beam signal compared to the remaining of the all second beam signals sent by the neighbor base station;

sending the second identification information to the UE, and receiving cell handover information which is venerated, by the UE, according to the plurality of neighbor second beam signals and the first beam signal, wherein the cell handover information includes Signal-to-Noise Ratios (SNRs) of the plurality of neighbor second beam signals configured by the base station.

7. The method of claim 6, wherein said receiving the second identification information comprises:

receiving a second beam signal, the second beam signal carrying the second identification information.

8. The method of claim 6, wherein said receiving the second identification information comprises:

receiving the second identification information through an interface between the base station and the neighbor base station.

9. User Equipment (UE), comprising a processor and memory, wherein the memory is adapted to storing an instruction executable by the processor, wherein the processor is adapted to:

receiving a first beam signal from a first cell where the UE camps, the first beam signal comprising second identification information that identifies a plurality of second beam signals configured by the first cell, the plurality of second beam signals configured by the first cell being a plurality of neighbor second beam signals neighboring the first beam signal, the plurality of neighbor second beam signals being at least a part of all second beam signals from a second cell neighboring the first cell, the plurality of neighbor second beam signals being spatially closer to the first beam signal compared to the remaining of the all second beam signals from the second cell;

determining the plurality of neighbor second beam signals according to the second identification information; receiving the plurality of neighbor second beam signals; and reporting cell handover information which is generated according to the plurality of neighbor second beam signals and the first beam signal, wherein the cell handover information includes Signal-to-Noise Ratios (SNRs) of the plurality of neighbor second beam signals.

10. The UE of claim 9, wherein the UE is in a state comprising at least one of a connected state or an idle state.

11. The UE of claim 10, wherein the processor is further adapted to, in response to the UE being in the idle state, while receiving the first beam signal, receiving another beam signal from the first cell that is spaced from the first beam signal by a number of beams less than a preset number, wherein the generating cell handover information according to the plurality of neighbor second beam signals and the first beam signal comprises:

generating the cell handover information according to the plurality of neighbor second beam signals, the first beam signal, and the another beam signal.

12. The UE of claim 10, wherein the first beam signal further comprises identification information that identifies the second cell, wherein the processor is further adapted to:

in response to the UE being in the connected state, determining whether the second cell is in a scene of high mobility according to the identification information that identifies the second cell; and in response to the second cell being in a scene of high mobility, accessing the second cell according to the cell handover information.

13. The UE of claim 12, wherein a second beam signal from the second cell in the scene of high mobility comprises a perpendicular beam signal perpendicular to a direction in which the UE moves, and a parallel beam signal parallel to the direction in which the UE moves, wherein the accessing the second cell according to the cell handover information comprises: establishing a communication connection with a base station that manages the second cell, and receiving the parallel beam signal.

14. A base station, comprising a processor and memory, wherein the memory is adapted to storing an instruction executable by the processor, wherein the processor is adapted to:

determining User Equipment (UE) that receives a first beam signal sent by the base station;

receiving second identification information in a beam signal sent by a neighbor base station of the base station, the second identification information identifying a plurality of neighbor second beam signals, the plurality of neighbor second beam signals being at least a part of all second beam signals sent by the neighbor base station, the plurality of neighbor second beam signals being spatially closer to the first beam signal compared to the remaining of the all second beam signals sent by the neighbor base station;

sending the second identification information to the UE; and receiving cell handover information which is generated, by the UE, according to the plurality of neighbor second beam signals and the first beam signal, wherein the cell handover information includes Signal-to-Noise Ratios (SNRs) of the plurality of neighbor second beam signals configured by the base station.

15. The base station of claim 14, wherein the processor is adapted to receiving the second identification information through an interface between the base station and the neighbor base station.

16. A communication system, comprising the UE of claim 9 and a base station, wherein the base station is configured to transmit the second identification information that identifies the plurality of neighbor second beam signals to the UE.

17. The communication system of claim 16, wherein the UE is configured to determine the second identification information that identifies the plurality of neighbor second beam signals to determine and receive the plurality of neighbor second beam signals without parsing information borne on a Physical Broadcast Channel (PBCH) PBCH of the plurality of neighbor second beam signals.

18. The communication system of claim 17, wherein the UE is configured to compute only the SNR of the plurality of neighbor second beam signals configured by the base station without computing SNR of each second beam signal from the second cell, thereby reducing time consumed in a handover and speeding up the handover of the UE.

* * * * *